United States Patent

Truesdell

[15] 3,656,791
[45] Apr. 18, 1972

[54] VEHICLE IMPACT-CUSHIONING DEVICE

[72] Inventor: Robert E. Truesdell, Rochester, Mich.

[73] Assignees: William H. Nienstedt, Detroit; Benjamin N. Colman, Smithfield, Mich., part interest to each

[22] Filed: Oct. 12, 1970

[21] Appl. No.: 79,996

[52] U.S. Cl. ............................293/1, 293/71 P, 280/150 AB
[51] Int. Cl. ....................................B60r 19/10, B60r 21/00
[58] Field of Search..........................293/1, 71 P; 280/150 AB

[56] References Cited

UNITED STATES PATENTS

| 3,567,245 | 3/1971 | Ekstrom | 280/150 AB |
| 3,588,142 | 6/1971 | Gorman | 280/150 AB |

FOREIGN PATENTS OR APPLICATIONS

| 953,312 | 3/1964 | Great Britain | 280/150 AB |
| 896,312 | 11/1953 | Germany | 280/150 AB |

*Primary Examiner*—Arthur L. La Point
*Assistant Examiner*—Robert Saifer
*Attorney*—Benjamin W. Colman

[57] ABSTRACT

An inflatable vehicle front end impact-cushioning device mounted on its forward end within a rupturable container securing an inflatable bag in compact form, in combination with a valved cylinder containing gas under pressure. Upon impact of the container with a resistant object, and at a substantially low speed of from about 3 miles to about 10 miles per hour, the forward portion of the device ruptures, triggering the gas valve and allowing the inflatable bag to promptly expand and inflate with gas, and to overlie and protect the forward-facing portion of the vehicle and the facing surface or surfaces of the object struck by the vehicle, whereby the inflated bag is positioned between the impacted object and the forward-facing portion of the vehicle to cushion the latter against substantial damage. The inflatable bag is designed, when expanded, to cover, overlie and protect the forward-facing portion of the vehicle.

35 Claims, 8 Drawing Figures

PATENTED APR 18 1972 3,656,791

INVENTOR.
ROBERT E. TRUESDELL

BY Benjamin T. Colman

ATTORNEY

INVENTOR.
ROBERT E. TRUESDELL

ATTORNEY

VEHICLE IMPACT-CUSHIONING DEVICE

The impact-cushioning device of this invention involves a base member which is attachable to the forward end of a vehicle, or a portion of such forward end, partially overlying the same, an inflatable resilient flexible bag of a plastic or fabric material or a combination of the two, highly resistance to abrasion and having intrinsic tensile strength and resistance to rupture upon impact, closely folded and compacted within a rupturable cover member secured to the base member and securing the open end of the bag about the open end of the cover member so that when the device is charged with gas under pressure, the folded compacted portion of the bag is forced tightly against the forward end of the cover member, i.e., the impacting end thereof, and a triggering pin disposed within the compacted bag and in operative connection with the gas cylinder valve to open the same when the pin is moved within the valve. The device is adapted to be charged with the gas through an opening in the base member of the device about the triggering pin.

The container, comprising the base member and the cover member, is so arranged that it is mountable upon a suitable portion of the forward end of the vehicle which it is designed to protect. The means for mounting the device by its base member to the vehicle is, of course, various and persons skilled in the art to which the invention pertains will have no difficulty in determining and providing suitable structures for clamping, mounting and/or securing the device of this invention to a vehicle. Forms of the device of this invention are illustrated in the drawings, but such showing, description and disclosure are not be understood as limiting the means of securement for the device.

The cover member over the inflatable bag, being complementary to the base member, is preferably a plastic molded product somewhat semi-spherical in shape and is arranged with a plurality of grooves on its inner, or optionally on its outer, surface so that a substantially reduced thickness in the cover member is present at these scored grooves. These grooves and the reduced thickness of the cover material adjacent the base of these grooves become stressed areas by molding, and are more easily rupturable than areas of the cover member intermediate the grooves. Should the cover member strike a resistant object with sufficient force to crack along one or more lines of such stress, the inflatable bag being under substantial pressure will effect further rupture of the cover, causing the cover member portions intermediate the grooves to fly outwardly, releasing the bag which fills with the gas discharged from the gas cylinder through the actuated valve into the open space or area between the bag and the base member. The very rapid release of the bag from the container causes it to expand and take a position between the forward end of the vehicle which it overlies and the object struck by the cover member upon impact. The time of cover rupture, bag inflation, and bag expansion to fill this area between the forward-facing portion of the vehicle and the object struck upon impact is measured in minute fractions of a second.

The inflatable pressurized bumper bag is maintained in folded compact form within the device mounted on the forward end of the vehicle and is so arranged that it can quickly and easily expand forwardly, upwardly, downwardly and/or laterally to each side of the base member supporting the bag.

The stressed areas on the inside or the outside surface of the cover member can be extended into the area closely adjacent the forward edge of the base member so that rupture of the cover member may or will take place adjacent the base member coincident with the rupture initiated at the forward end of the cover, along its sides, or adjacent the base member.

It is an object of the invention to provide an impact-cushioning device for a vehicle containing a gas inflatable force-absorbing bag which is inflatable and expandable into the area forward of the front end of a moving vehicle and the object which it strikes. Another object is to provide a flexible expandable bag prearranged in compacted form within the device, the bag being charged with a gas discharged from a cylinder under substantial pressure upon impact of the device with a resistant object. Yet another object is to provide a cover member for the device which is easily and readily rupturable upon impact, so that the inflatable bag charged with gas under pressure is allowed to readily and quickly expand into the area intermediate the forward-facing end of the vehicle and the object or objects impacted. Still a further object is to provide an impact-cushioning device for a vehicle which is easily attachable to the forward end of the vehicle, is substantially unitary, and contains an inflatable force-absorbing element to protect the forward end of the vehicle from substantial damage. Yet another object is to provide an impact-cushioning device which provides protection against damage for the forward end of the vehicle moving at from approximately 3 to about 10 miles per hour when it strikes a resistant object.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a perspective view of the front end of a motor vehicle having one form of the impact-cushioning device of this invention mounted at its forward end.

Figure 2:
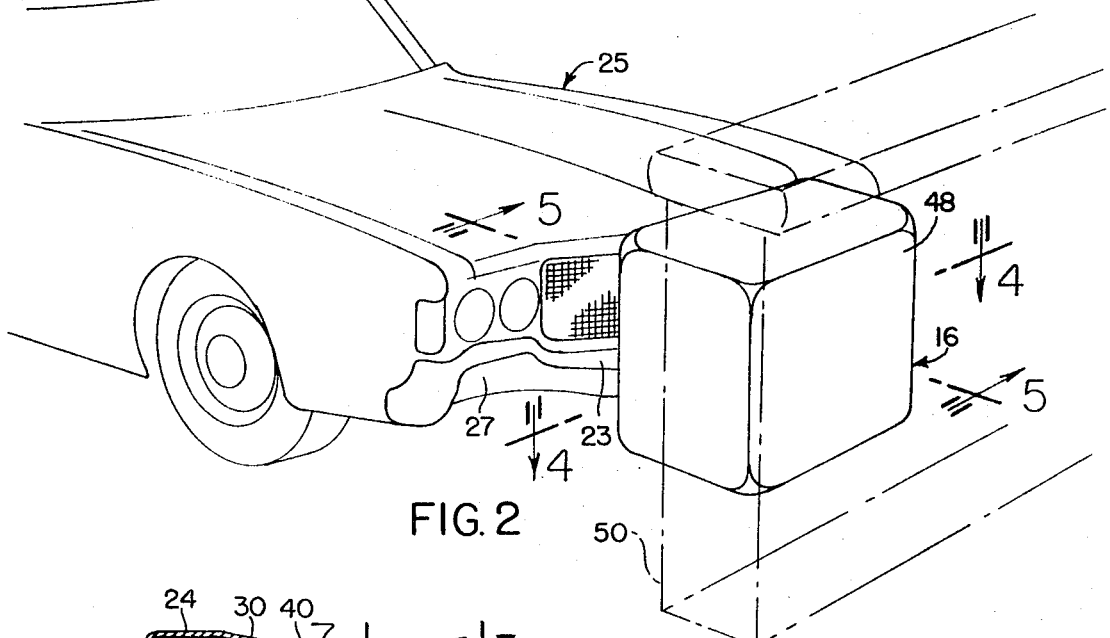
FIG. 2 is a perspective view similar to that illustrated in FIG. 1, showing the impact-cushioning element of the device of this invention in an expanded form.
Figure 4:
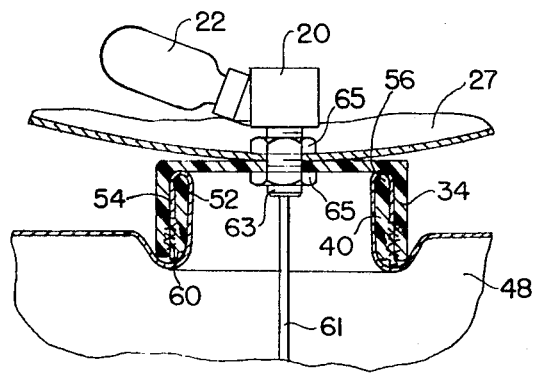
Figure 5:
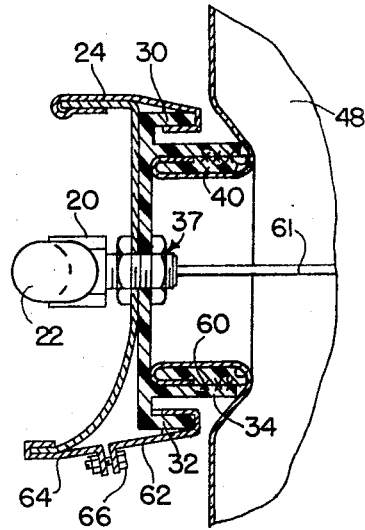

FIGS. 4 and 5 are horizontal and vertical transverse sectional views, respectively, taken substantially on the lines 4—4 and 5—5 of FIG. 2.

Figure 1:
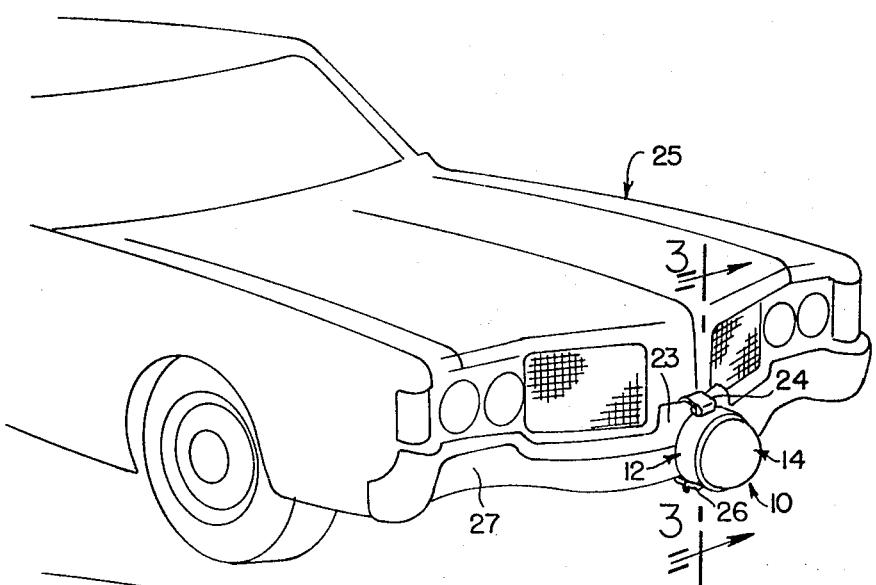
Figure 3:
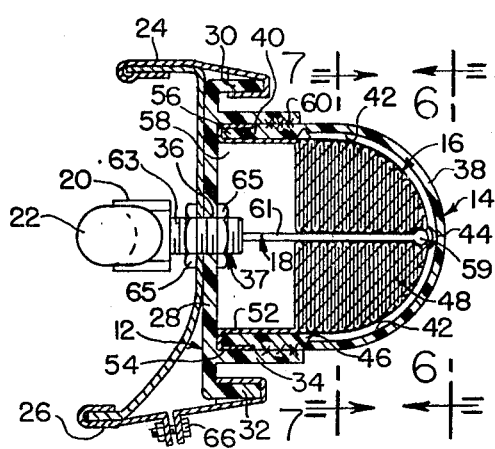
FIG. 3 is a transverse vertical sectional view taken through the device and substantially on the line 3—3 of FIG. 1.
Figure 6:
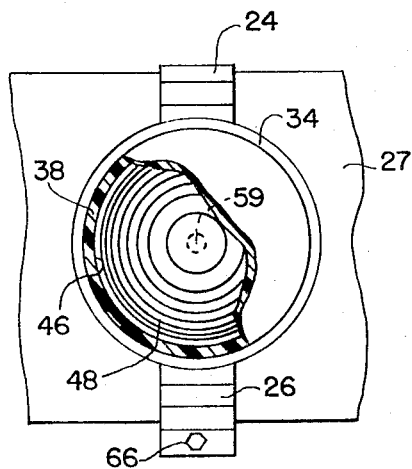

FIG. 6 is a front elevational view of the impact-cushioning device illustrated in FIG. 1, with a portion of the cover member broken away, taken substantially on the line 6—6 of FIG. 3.

Figure 7:
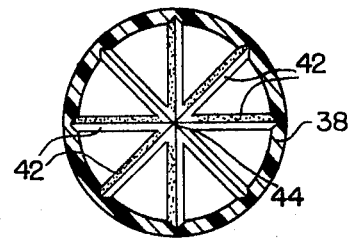

FIG. 7 is an elevational view of the interior surface of the rupturable closure for the inflatable impact-cushioning element, taken substantially on the line 7—7 of FIG. 3.

Figure 8:
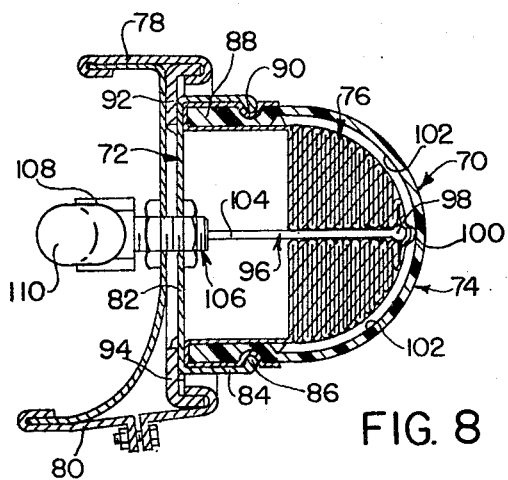

FIG. 8 is a view similar to that illustrated in FIG. 3, showing a slightly modified form of the device of this invention.

As illustrated in the several views of the drawings, and particularly in FIGS. 1 through 7 inclusive, the impact-cushioning device 10 comprises a base member 12, a cover member 14, an inflatable expandable bag 16, a triggering pin 18, a valve 20 and a gas cylinder 22. The device is secured to the forward end 23 of the vehicle 25, as for example to the bumper 27, by upper and lower bracket members 24,26.

The base member 12 comprises a body portion 28, upper and lower flange portions 30 and 32, respectively, integrally formed with the body portion and extending substantially at right angles thereto, an annular flange or hub 34 integrally formed with and extending from the body portion 28 and disposed adjacent but within the compass of the flange portions 30,32. The latter flange portions are provided as means for engagement by the bracket members 24 and 26, respectively, to secure the base member to the bumper 27 on a portion of its forward surface, or to any other desired portion of the vehicle 25 which is sought to be protected by the device 10.

The base member is preferably molded of a plastic material such as ABS (acrylonitrile-butadiene-styrene) material, or similar or comparable plastic material which can be ultrasonic-welded, heat-sealed, fusion-welded, adhered together and/or conjoined by a process meeting the requirements of the device disclosed herein. The body portion 28 of the base member is initially provided with a transverse opening 36 to allow for the introduction therethrough of a sealed fitting 37 adapted to pass one end of the pin 18 therethrough to the valve 20 secured to one end of the fitting.

The cover member 14 comprises a crown portion 38 terminating in an annular extension 40 adapted to seat closely within the annular flange 34 of the base member 12, with a substantially close press fit. As will be seen particularly in FIGS. 3, 6 and 7, the interior surface of the crown portion is provided with a plurality of radial grooves 42 joining together at an apex 44 in the peak of the crown portion 38, and an annular groove 46 substantially adjacent the annular extension 40 and the distal end of the annular flange 34 of the base member. The annular groove 46 joins with the radial grooves 42 at their base. Although the radial and annular grooves 42 and 46, respectively, are illustrated and described as being formed and disposed in the interior surface of the crown portion 38 of cover member 14, it will be understood that such grooves can alternatively be disposed in the outer surface of the crown portion 38, and optionally, such grooves may be formed in both the inner and outer surfaces of the cover crown portion.

The cover member 14 is made of a material similar to or compatible with the material utilized in the base member 12. Such materials include ABS and other similar materials which can be fusingly or adhesively joined together in gas-tight relationship. The cover member 14 is preferably molded of a single mass of material with the radial and annular grooves embodied directly therein during the molding process.

Although the crown portion 38 is illustrated as having a semi-spherical configuration, of course many other shapes and modifications of design can be provided for such portion of the cover member. For instance, it may be conical or frusto-conical, cylindrical, prismatic, substantially spherical, parabolic, or of any other suitable configuration.

The inflatable expandable bag 16 comprises a body portion 48 which can be preformed into any desired configuration such as the rectangular form illustrated particularly in FIG. 2, a cubical form, a spherical form, or any other desired or required configuration adapted to absorb the forces of impact generated when the peak end 44 of the crown portion 38 of cover member 14 strikes a resistant object such as the wall 50, illustrated in broken lines in FIG. 2. The bag is provided with a tubular end portion 52, the distal end 54 of which is folded closely about the distal edge portion 56 of the annular extension 40 of the cover member 14, so that the end 54 overlies a portion of the outer surface of the annular extension.

The bag 16 is preferably made of Mylar, a DuPont trademark for its polyester material, or of a woven nylon or dacron type material having great tensile strength, facile expandability, substantial flexibility, readily inflatable, and highly resistant to rupture. The body portion 48 and the tubular end portion 52 are preferably treated and coated with a material which substantially fills the pores of the woven bag, such for example as a neoprene rubber or a urethane material of high rupture resistance and excellent tensile strength. Of course, it will be understood by persons skilled in the art that other similar or diverse materials can be used to fabricate the inflatable expandable bag 16 required to fulfill the purposes of the invention.

The triggering pin 18 is metallic and comprises a head 59 connected to a stem 61 which extends through the fitting 37 into operative association with the valve 20 which is secured to the fitting 37. When the cover member 14 is assembled with the base member 12, the pin head 59 is disposed within the bag body portion 48 (FIG. 3) closely adjacent the crown peak 44 and preferably seated snugly in the root of the radial grooves 42 at the peak. The pin stem 61 extends from such position to operative association with a portion of the one-way valve 20, such as a diaphragm or other element therein, whereby when the pin stem is moved slightly rearwardly in the valve, gas from the cylinder 22 is promptly released through the valve, the fitting 37 about the pin stem and into the chamber 58 of the bag 16 at its tubular end portion 52 forward of the base portion 28.

The valve 20 is preferably a one-way valve of any suitable construction for use with the gas cylinder 22. Persons skilled in valve art can readily provide a one-way valve suitable for use with the triggering pin 18 which effects release of the gas from gas cylinder 22 operatively connected to the valve 20. The valve can be secured to the fitting 37 at any time.

Gas cylinder 22 is of conventional construction and is provided with means to be secured to the valve 20. Gas is preloaded under pressure into the cylinder by the gas manufacturer, and the cylinder becomes a storage container therefor. The cylinder can be conjoined to the valve at any time.

Fitting 37 comprises a tubular element 63 threaded on its outer surface and connected to the base portion 28 by sealing nuts 65,65. The bore of the fitting is sufficiently large in area to pass the pin stem 61 therethrough and pressurized gas from the valve 20 into the bag 16 at a very fast rate when the valve is opened upon actuation by the pin stem.

The device 10 is fabricated by folding and compacting the inflatable bag 16 within the interior of the cover member 14 about the pin head 59 and the pin stem 61, the distal end 54 of the tubular end portion 52 extending about and overlying the outer edge 56 of the annular extension 40 and somewhat up the side and outer surface of the annular extension. When so assembled, the body portion 48 of bag 16 is folded in compact form within the crown portion 38 of the cover member toward the crown peak 44 leaving an open space or area 58, above the compacted body portion, within which gas under pressure can be introduced through the fitting element 63 attached to the base member body portion 28. The cover member 14 with the bag 16 and pin 18 disposed therein is then placed within the annular flange 34 of the base member until the edge 56, with the bag portion 52 thereover, bears closely upon the body portion 28 of the base member, the distal end 54 of the bag being closely confined between the annular flange 34 and the annular extension 40, and the pin stem extends through the fitting element 63 secured to the base portion 28. The assembled device is then placed within a fusion welding machine, such as for example an ultrasonic welding machine, which seals a portion of the inner surface of the annular flange 34 to the outer surface of the annular extension 40 creating a positive seal against leaking of gas introduced into the area 58. This sealing or welding of the two members may be performed by any number of suitable processes including ultrasonic-welding, heat-sealing, adhesives, fusion-welding, etc.

The gas which is introduced under pressure into the open area 58 may be air, carbon dioxide, freon, or some other gas, preferably non-toxic, which will inflate and expand the bag body portion 48 released from the crown portion 38 of the cover member 14.

ABS materials can be ultrasonic-welded by a process now well known in the art for conjoining suitable plastic materials together. The fusion joint 60 formed by the annular flange 34 and the annular extension 40 is one produced by suitable fusion-welding equipment. This joint is annular and provides a positive seal against escape of gas introduced into the open area 58 through the fitting 37, and anchors the cover member 14 to the base member 12 against separation of the two members when pressurized gas is introduced into and inflates the bag 16.

The assembly of the device 10 preferably proceeds as follows. The base member 12 is first formed as a molded plastic part. The cover member 14 is also molded from a suitable plastic material with the radial and annular grooves 42 and 46, respectively, being formed in the inner and/or the outer surface of the crown portion 38. The depth and width of the grooves will vary depending upon the wall thickness of the crown portions as well as upon its particular chemical composition, in order to effect rupture and separation of the crown portion from the secured annular extension 40 upon impact of a predetermined magnitude. The thickness of the crown portion through the apex of the radial and annular grooves should preferably be such that when the device 10 is charged with gas under pressure, the inflating bag portion 48 will effect separation of the crown portion 38 from the annular extension 40. That should occur only upon an impact of the crown portion with a resistant object, forcing the triggering pin 18 into the valve 20 to release gas from cylinder 22 into the open space 58, and producing ruptures in the crown portion along and at the grooves whereby the gas-charged bag 16 pushes the crown portion or elements thereof, outwardly to provide an escape route for the bag into an inflated configuration, one shape of such inflatable bag being illustrated in FIG. 2.

When the cover member 14, bag 16 and base member 12 have been assembled as above described, the device 10 is then ready for attachment to a portion of the forward end 23 of the vehicle 25, as for example upon the outwardly facing side of the bumper 27. Bracket member 24 is engaged upon the upper flange or portion of the bumper and upper peripheral flange portion 30 is slipped within the forward end of the bracket member. The lower bracket member 26, which comprises complementary front and rear elements 62 and 64, respectively, are engaged upon the bumper 27 and the lower peripheral flange portion 32 of the base member, and these elements are secured together by a screw and nut assembly 66. The device 10 is now firmly engaged and mounted upon the bumper 27. Other means of securing the device 10 to the forward end 23 of the vehicle, at selected areas thereof, of course can be utilized and will be readily apparent to persons skilled in the art to which the invention pertains. Locations for the device 10 other than that disclosed may be preferable, depending upon the configuration of the vehicle forward end portion or portions which are to be especially protected against damage. The device 10 may also or alternatively be secured to the rearward end of a vehicle in the same manner and to the same effect.

The modified device 70 including a metallic base member is illustrated in FIG. 8 and comprises the base member 72, the cover member 74, the bag 76, and the upper and lower bracket members 78 and 80, respectively. The cover member 74, bag 76 and bracket members 78 and 80 are substantially the same as described above for the device 10 and as illustrated in the several views of the drawings including FIGS. 1–7 inclusive. The base member 72, however, is formed of metal, by stamping or other suitable process, with a body portion 82 and an annular flange 84 having its outer edge 86 turned inwardly to engage the annular extension 88 of the cover member 74 in an annular groove 90. The upper and lower retaining lugs or members 92 and 94, respectively, are secured to the bottom surface of the body portion 82 preferably by welding and are disposed substantially 180° apart with their distal ends being turned outwardly and substantially parallel to the annular flange 84 so as to provide more positive engagement with the bracket members 78 and 80, respectively. A triggering pin 96 with its head 98 disposed in the crown of the bag 76 adjacent the peak 100 of the radial grooves 102 has its stem 104 passed through the fitting 106 into operative association with valve 108. Gas cylinder 110 is charged with gas under pressure before attachment and connection to the valve 108.

The securement of the base member 72 in gas sealing relationship and the cover member 74 may of course be effected in a number of ways, a preferred assembly of these members being described above. Persons skilled in the art can alternatively select one of a number of other suitable means for effectively assembling these members. Gas under pressure is charged through the one-way valve 108 by operation of the pin 96 into the bag 76 causing it to inflate and expand against the cover member 74.

In operation, the device 10, or 70, functions as follows. Upon impact at the crown portion 38 of the cover member 14 with a resistant object, as for instance a surface of the wall 50, elements of the crown portion 38 will crack along the radial grooves 42, which are particularly stressed in the molding process, and the triggering pin 18 will be pushed inwardly into actuation of the valve 20, releasing the pressurized gas in cylinder 22 into the chamber 58 inflating the bag 16 and forcing it against the cover crown portion 38. The crown portion will crack along these grooves and then open or move outwardly under the force of the inflatable bag 16 which is pressed firmly against the inner surface of the crown by the gas pressure in the open space 58. The plastic material of the cover member is designed to be such that slight cracking in the stressed groove areas effects a fracture of the crown elements intermediate the grooves, the bag 16 being released to expand and inflate and drive the crown portion 38 from the annular extension 40 along the annular groove 46. Some of the crown portion elements may remain attached to the annular extension and if such is the result, they will be bent backwardly and outwardly about the annular flange 34 adjacent the root of the annular groove 46. If all of the elements of the crown portion separate at the annular groove 46, the bag 16 will expand freely about the fractured edge of the annular extension 40 and the edge of the annular flange 34, FIGS. 4 and 5. The bag 16 when inflated assumes a position between the wall 50 and the forward end 23 of vehicle 25 to provide an impact-cushioning and force-absorbing member designed to protect the vehicle against damage, FIG. 2. The device 70 functions is a substantially identical manner.

The device 10 or 70 can of course be designed into the vehicle by the manufacturer as original equipment. The device can be installed as original equipment or as an accessory not only at the forward end of the vehicle but also, or alternatively, at its rearward end, or portion(s) thereof, or at any other desired location. The device 10 or 70 can be directly bolted to the supporting portion of the vehicle, or secured by any other suitable means.

The gas pressure of the cylinder 22, chargeable into the bag 16 or 76, is preferably in the range of from about 25 to about 1,500 or 2,000 psi, prior to inflation and expansion of the bag, depending upon the size and construction of the inflated bag, the type of gas being used, and the anticipated forces against which protection is sought.

Although certain particular embodiments of the invention are hereindisclosed for purposes of explanation, further modifications thereof, after study of this specification, will become apparent to those skilled in the art to which the invention pertains. Reference should be had to the appended claims in determining the scope of the invention.

I claim:

1. An impact-cushioning device adapted to be mounted at an impact position on a vehicle, comprising in combination
    a base member adapted to be secured to said vehicle and having a body portion and an annular flange projecting therefrom,
    a cover member having a crown portion and an annular extension integrally formed therewith and sealingly secured to said base member annular flange,
        said crown portion being subject to facile rupture upon impact with a resistant object,
    an inflatable expandable bag having a body portion compactly folded within said crown portion and a tubular end disposed within said annular extension and adjacent the inner surface thereof to form a gas receiving chamber defined by said base member body portion and said bag tubular end,
    a triggering pin partially disposed in said inflatable bag and having
        a head within said bag closely adjacent the crown peak of said cover member, and
        a stem connected to said head and extending through said compactly folded bag body portion, said gas chamber and said base member body portion,
    a valve controlled cylinder charged with gas under pressure connected to said base member and communicating with said chamber for discharge of said gas thereinto and into said bag,
        said cylinder being operatively connected to valve means communicating with said gas chamber,
        the distal end of said pin stem being disposed in said valve means for actuation thereof upon impulsion of said pin, whereby said bag upon inflation provides an impact-cushioning element between said vehicle to which said device is secured and a resistant object impacted by the crown portion of said device.

2. The device defined in claim 1, and wherein said base member and said cover member are secured together in gas sealing relationship.

3. The device defined in claim 1, and wherein said base member is formed as an integral unit of a plastic material suitable for fusion-welding with said cover member.

4. The device defined in claim 1, and wherein said base member is formed as an integral unit of a plastic material suitable for adhesive sealing with said cover member.

5. The device defined in claim 1, and wherein said base member is provided with flange portions adapted to be engaged for mounting said device at an impact position on said vehicle.

6. The device defined in claim 1, and wherein said base member is formed as an integral unit of a metallic material.

7. The device defined in claim 6, and wherein said base member is mechanically secured to said cover member in gas sealing relationship.

8. The device defined in claim 1, and wherein said base member annular flange is substantially cylindrical and projects from said body portion substantially normal to the plane of said body portion.

9. The device defined in claim 8, and wherein said base member annular flange and said cover member annular extension are concentrically arranged and secured together.

10. The device defined in claim 1, and wherein said cover member is formed as an integral unit of a plastic material suitable for fusion-welding with said base member.

11. The device defined in claim 1, and wherein said cover member is formed as an integral unit of a plastic material suitable for adhesive sealing with said base member.

12. The device defined in claim 6, and wherein said cover member is formed as an integral unit of a plastic material suitable for mechanical securement to said metallic base member in gas sealing relationship.

13. The device defined in claim 1, and wherein said cover member crown portion is provided with radial grooves conjoined at and extending from the crown peak to said annular extension.

14. The device defined in claim 13, wherein said radial grooves are provided in the inner surface of said crown portion.

15. The device defined in claim 13, wherein said radial grooves are provided in the outer surface of said crown portion.

16. The device defined in claim 13, wherein said radial grooves are proved in the innner and outer surfaces of said crown portion.

17. The device defined in claim 1, and wherein said cover member crown portion is provided with an annular groove adjacent the distal end of said annular flange.

18. The device defined in claim 17, and wherein said annular groove is provided in the inner surface of said crown portion.

19. The device defined in claim 17, wherein said annular groove is provided in the outer surface of said crown portion.

20. The device defined in claim 17, wherein said annular groove is provided in the inner and outer surfaces of said crown portion.

21. The device defined in claim 1, and wherein said cover member crown portion is provided with radial grooves conjoined at and extending from the crown peak and an annular groove adjacent the distal end of said annular flange,
the distal ends of said radial grooves terminating in the plane of said annular groove.

22. The device defined in claim 1, and wherein said inflatable bag is formed of a polyester resin material.

23. The device defined in claim 1, and wherein said inflatable bag is formed of a woven nylon material.

24. The device defined in claim 1, and wherein said inflatable bag is formed of a woven dacron material.

25. The device defined in claim 1, and wherein said inflatable bag is formed of a relatively gas impervious material.

26. The device defined in claim 1, and wherein said inflatable bag is initially compactly folded in said crown portion for facile inflation and expansion upon rupture of said crown portion.

27. The device defined in claim 1, and wherein said inflatable bag tubular end is secured by the assembly of said base member and cover member.

28. The device defined in claim 27, and wherein the distal end of said tubular end is disposed over the distal edge of said annular extension and about the outer surface thereof,
said distal end being secured between said distal edge and said base member body portion, and between said annular flange and said annular extension.

29. The device defined in claim 1, and wherein said gas receiving chamber is provided substantially in the area defined by said annular extension.

30. The device defined in claim 1, and wherein said gas receiving chamber is formed by said base member body portion and the interior surface of said inflatable bag.

31. The device defined in claim 1, and wherein said gas cylinder is charged with said gas to a pressure adapted to sufficiently inflate and expand said inflatable bag whereby said bag becomes a protective impact-cushioning element for said vehicle.

32. The device defined in claim 1, and wherein said valve means comprises a one-way valve adapted to discharge gas from said cylinder into said chamber and inflatable bag upon actuation of said valve by said pin stem.

33. The device defined in claim 1, and wherein said valve means comprises
a one-way gas valve, and
a tubular fitting secured to said base member body portion in gas sealing relationship and securing said valve controlled gas cylinder to said base member,
said fitting having an opening therethrough to pass said pin stem to said valve and said gas to said chamber.

34. The device defined in claim 1, and wherein said device is secured to said vehicle by bracket members engageable with said base member and a portion or portions of said vehicle at an impact position thereof.

35. The device defined in claim 1, and wherein vehicle device is secured to said vehicle by directly mounting said base member upon a portion or portions of said vehicle at an impact position thereof.

* * * * *